United States Patent [19]

Hamada et al.

[11] 4,386,521

[45] Jun. 7, 1983

[54] INDICATOR FOR LOCK-UP STATE OF LOCK-UP TYPE AUTOMATIC TRANSMISSION

[75] Inventors: Hideo Hamada; Yoshiro Morimoto, both of Yokosuka; Masaaki Suga, Yokohama; Masaaki Futagi; Tadashi Suzuki, both of Yokosuka, all of Japan

[73] Assignee: Nissan Motor Company, Limited, Yokohama, Japan

[21] Appl. No.: 291,840

[22] Filed: Aug. 10, 1981

[30] Foreign Application Priority Data

Aug. 11, 1980 [JP] Japan ................... 55-109140

[51] Int. Cl.³ .................................. G01M 13/02
[52] U.S. Cl. .................... 73/118; 192/30 W
[58] Field of Search ............ 73/118, 168; 192/30 W; 74/DIG. 7; 116/28.1, DIG. 20

[56] References Cited

U.S. PATENT DOCUMENTS 3,686,935 8/1972 May .................. 73/118 X
4,208,929 6/1980 Heino et al. ............ 74/731

FOREIGN PATENT DOCUMENTS 21258 7/1978 European Pat. Off. .
2375508 7/1981 France .

*Primary Examiner*—Jerry W. Myracle
*Attorney, Agent, or Firm*—Schwartz, Jeffery, Schwaab, Mack, Blumenthal & Koch

[57] ABSTRACT

An indicator system includes an indicator mounted near a driver's seat and arranged to be responsive to a lock-up permission signal which is to appear when the vehicle is operating within a lock-up range.

3 Claims, 4 Drawing Figures

INDICATOR FOR LOCK-UP STATE OF LOCK-UP TYPE AUTOMATIC TRANSMISSION

BACKGROUND OF THE INVENTION

1. Field of the Invention

The present invention relates to an indicator for the lock-up state of a lock-up type automatic transmission, and more particularly to an indicator for indicating whether the torque converter of the automatic transmission operates in a lock-up state or in a converter state.

2. Description of the Prior Art

Automatic transmission is provided with a torque converter in a power transmission system thereof so as to increase a torque from an engine. The torque converter has a pump impeller driven by an engine to rotate a working fluid within the torque converter wherein the rotation of the working fluid causes a turbine runner to rotate under the reaction of a stator, thereby multiplying the torque (torque converter state). Therefore, during the operation of the torque converter, there occurs a slip between the pump impeller and the turbine runner and therefore the automatic transmission provided with such a torque converter in its power transmission system is easy in operation but has a drawback of poor power transmission efficiency, leading to a poor fuel economy. To alleviate this drawback, there has been proposed a so-called torque converter with a direct clutch (also called a lock-up torque converter) wherein during a relatively high vehicle speed operation range when a torque variation of an engine does not create a problem a turbine runner is directly connected to a pump impeller (lock-up state), thereby eliminating a slip therebetween, and a lock-up type automatic transmission provided with a torque converter of this kind in a power transmission system thereof is already employed in some vehicles.

Where a torque converter with a direct clutch is caused to operate in a lock-up state whenever a vehicle speed exceeds a respective predetermined vehicle speed (lock-up vehicle speed) during operation in at least one of gear ratios, the lock-up ranges of such an automatic transmission are illustrated in FIG. 4. This Figure is a shift pattern diagram wherein $V_1$, $V_2$, and $V_3$ denote predetermined lock-up vehicle speeds for a first gear ratio, for a second gear ratio, and for a third gear ratio, and A, B, and C denote lock-up ranges for the first gear ratio, the second gear ratio, and the third gear ratio, respectively. In the case of the automatic transmission wherein a lock-up clutch is engaged whenever the vehicle speed exceeds a lock-up vehicle speed during operation in each of the gear ratios, when the vehicle undergoes an automatic gear shifting operation with an accelerator pedal depressed to a great degree (a great opening degree of throttle), the torque converter remains in a lock-up state during gear shifting operation because the lock-up ranges A to C are adjoin one after another. However, if the gear shifting is effected with the torque converter remaining in the lock-up state, a torque variation is not absorbed by the torque converter, thus allowing a great shock to take place upon gear shifting.

Accordingly, the lock-up type automatic transmission of this kind is designed to suspend the lock-up state upon gear shifting even when the vehicle operates in the above-mentioned lock-up range. For this purpose, a gear shifting detector circuit is provided which issues a gear shifting signal indicative of a gear shifting and it is designed to temporalily suspend the lock-up state even during operation within the lock-up range while the gear shifting signal is being issued by this circuit.

In a vehicle installed with a lock-up type automatic transmission, it is advantageous for the purpose of enhancing market value to provide a lock-up indicator so as to have a driver to recognize whether the torque converter is within a converter state or lock-up state. Conventionally, a lock-up indicator has a pressure switch which is arranged to be responsive to a hydraulic pressure so as to provide an arrangement wherein the pressure switch turns on or off a lock-up indicator such as a monitor lamp thereby to inform a driver whether the torque converter operates within a lock-up state.

However, with such a lock-up indicator, the lock-up indication is temporarily turned off, although the vehicle operates within a lock-up range, in response to the above-mentioned suspension of a lock-up state during each gear shifting and subsequently turned on after the gear shifting has been completed, causing monitor lamp which usually constitutes the lock-up indication to turn off temporarily, interfering with the driver's view and causing the driver to take it as a sign that the lock-up indicator has gone out of order.

SUMMARY OF THE INVENTION

An object of the present invention is to provide an improved indicator for indicating whether the torque converter operates in a lock-up state or in a converter state wherein an indication is maintained while the vehicle operates within a lock-up range.

According to the present invention, an indicator system comprises indicator arranged to be responsive to a lock-up permission signal so as to maintain its indication independent of the temporal suspension of the lock-up state during gear shifting operation in the transmission.

BRIEF DESCRIPTION OF THE DRAWINGS

The present invention will be described hereinafter in connection with the embodiments illustrated in the drawings, in which.

DESCRIPTION OF THE PREFERRED EMBODIMENTS

Figure 1:
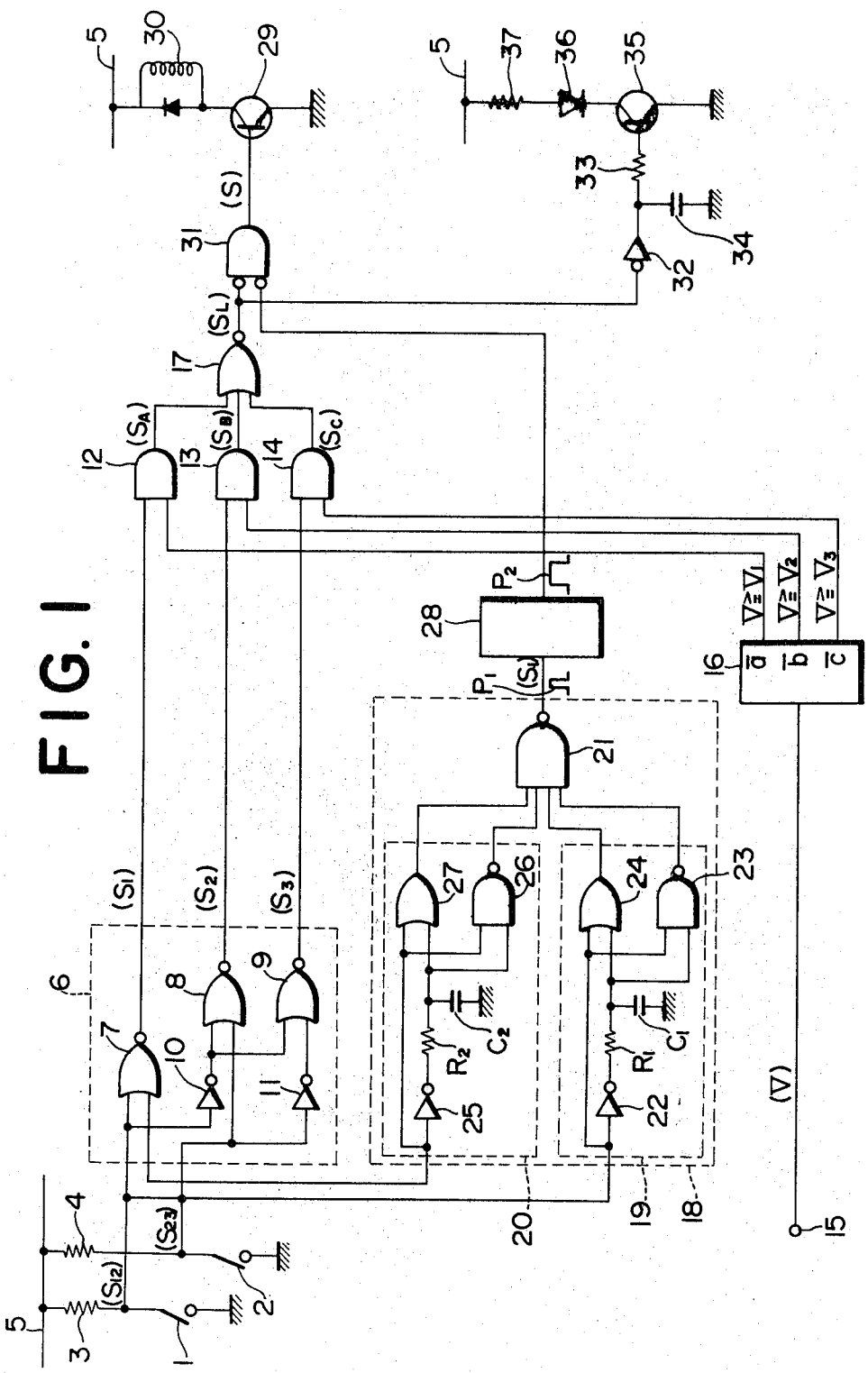
FIG. 1 is a circuit diagram of an indicator according to the present invention illustrated in connection with a lock-up control system for a lock-up type automatic transmission.

FIG. 1 illustrations embodiment as indicator system according to the present invention as applied to an electronically controlled lock-up control system employed by a three-speed automatic transmission. Firstly, the lock-up control system is explained wherein the reference numeral 1 designates a 1-2 shift switch and 2 designates a 2-3 shift switch, these switches being mounted within a 1-2 shift valve and a 2-3 shift valve which perform the control of a gear change in the automatic transmission and each of them going to an ON state in response to the downshift position of the corresponding shift valve or to an OFF state in response to the upshift position of the shift valve. Thus, the shift switches 1 and 2 go to ON or OFF state, as shown in the following TABLE 1, depending upon various gear positions.

TABLE 1

| Switch | Gear Position | | |
|---|---|---|---|
| | 1st Gear | 2nd Gear | 3rd Gear |
| 1-2 Shift switch 1 | ON | OFF | OFF |
| 2-3 Shift switch 2 | ON | ON | OFF |

Further, both of the shift switches 1 and 2 are connected via resistors 3 and 4, respectively, with a power supply circuit 5 so that when these switches go to OFF states, a 1-2 shift signal $S_{12}$ goes to a H level urged by an electric voltage provided by the power supply circuit 5 and likewise a 2-3 shift signal $S_{23}$ goes to a H level urged by the electric voltage provided by the power supply 5, whereas, when the switches 1 and 2 go to ON states, the 1-2 shift switch $S_{12}$ goes to a L level and the 2-3 shift signal $S_{23}$ goes to a L level because the power supply circuit 5 is grounded. Accordingly, the 1-2 shift signal $S_{12}$ and 2-3 shift signal $S_{23}$ show various levels, as shown in the following TABLE 2 in response to gear positions, respectively.

TABLE 2

| Switch | Gear Position | | |
|---|---|---|---|
| | 1st Gear | 2nd Gear | 3rd Gear |
| 1-2 Shift signal $S_{12}$ | L | H | H |
| 2-3 Shift signal $S_{23}$ | L | L | H |

The both shift signals $S_{12}$ and $S_{23}$ are fed to a gear position decision circuit 6 which makes a decision of a current gear position in response to various combinations, as shown in the above-mentioned TABLE 2, of levels of the both shift signals. For this purpose, the gear position decision circuit 6 comprises NOR gates 7, 8 and 9 and NOT gates 10 and 11. At the first gear position when both of the shift signals $S_{12}$ and $S_{23}$ are L levels, these signals cause NOR gate 7 to issue a H level first gear signal $S_1$, at the second gear position when only the shift signal $S_{12}$ goes to a H level, this causes NOR gate 8 to issue a H level second gear signal $S_2$, and at the third gear position when the shift signal $S_{23}$ goes to a H level also, this causes NOR gate 9 to issue a H level third gear signal $S_3$. Thus, the gear position decision circuit 6 issues a H level first gear signal $S_1$ from the corresponding gate 7 only in response to the first gear position, issues a H level second gear signal $S_2$ from the corresponding gate 8 only in response to the second gear, and issues a H level third gear signal $S_3$ from the corresponding gate 9 in response to the third gear, and feeds each of the signals to one of the inputs of the corresponding AND gate 12 or 13 or 14.

Figure 4:
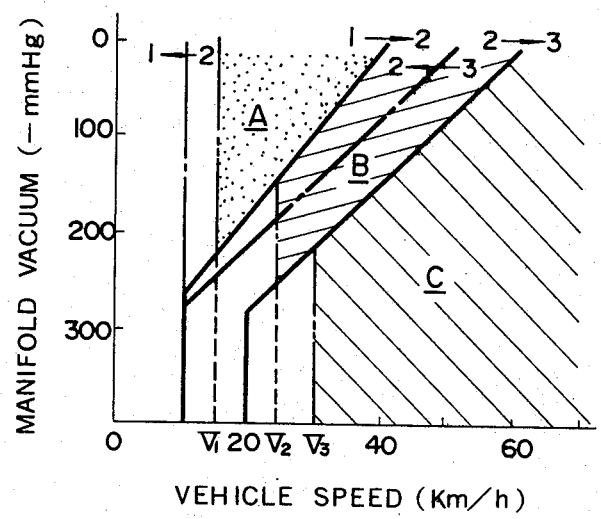
FIG. 4 is a shift pattern diagram of the automatic transmission illustrating the lock-up ranges described before.

Designated by 15 is a vehicle speed sensor which generates a vehicle speed signal (an electric voltage) V in response to the vehicle speed and feeds this vehicle speed signal V to a vehicle speed comparator circuit 16. The vehicle speed comparator circuit 16 stores the lock-up vehicle speed $V_1$ for the first gear, the lock-up vehicle speed $V_2$ for the second gear and the lock-up vehicle speed $V_3$ for the third gear, which were described before in connection with FIG. 4, and it compares the above-mentioned vehicle speed signal V supplied thereto with these lock-up vehicle speeds. The vehicle speed comparator circuit 16 issues a H level signal from a gate $\bar{a}$ when $V \geq V_1$, issues a H level signal from a gate $\bar{b}$, too, when $V \geq V_2$, and issues a H level signal from a gate $\bar{b}$, too, when $V \geq V_2$ and issues a H level from a gate $\bar{c}$, too, when $V \geq V_3$, and feeds these signals to the other input terminals of the AND gates 12 to 14. Then, the AND gates 12 to 14 perform an AND operation between the H level signals supplied, where the AND gate 12 issues a H level signal $S_A$ when the vehicle operates within the first gear lock-up range A as shown in FIG. 4, the AND gate 13 issues a H level signal $S_B$ when the vehicle operates within the second gear lock-up range B shown in FIG. 4, and the AND gate 14 issues a H level signal $S_C$ when the vehicle operates within the third gear lock-up range C shown in FIG. 4. Upon receiving these signals $S_A$ or $S_B$ or $S_C$, the NOR gate 17 issues a L level lock-up permission signal when the vehicle operates within the range A or B or C as shown in FIG. 4.

The above-mentioned components form a lock-up decision circuit, which circuit makes a decision whether or not a lock-up is to take place by issuing a lock-up permission signal $S_L$ when the vehicle speed (vehicle speed signal V) exceeds the lock-up vehicle speed $V_1$ or $V_2$ or $V_3$ during operation in the corresponding gear position (first gear or second gear or third gear), as is apparent from the preceding description.

Now, the 1-2 shift signal $S_{12}$ and 2-3 shift signal $S_{23}$ are fed to a gear shifting detector circuit 18, which circuit comprises an edge trigger circuit 19 that detects a rise and a fall in the 1-2 shift signal $S_{12}$, an edge trigger circuit 20 that detects a rise and a fall in the 2-3 shift signal $S_{23}$, and a NAND gate 21. The edge trigger circuit 19 comprises a NOT gate 22, a resistor $R_1$ and a capacitor $C_1$ that cooperate to form a delay circuit, a NAND gate 23 for detecting a rise in the signal, and a OR gate 24 for detecting a fall in the signal. Similarly, the edge trigger circuit 20 comprises a NOT gate 25, a resistor $R_2$ and a capacitor $C_2$ that cooperate to form a delay circuit, a NAND gate 26 and an OR gate 27. Each of the edge trigger circuits 19 and 20 issues a negative polarity pulse signal (the pulse width being determined by the corresponding delay circuit) to the corresponding one of input terminals of a NAND gate 21 in response to a change in the corresponding shift signal $S_{12}$ or $S_{23}$ from a L level to a H level or from a H level to a L level, viz, upon occurrence of a gear shifting. This causes the NAND gate 21 to issue, by inverting said pulse signal, a positive polarity trigger pulse $P_1$ and feeds it to a timer 28 as a gear shifting signal $S_t$. With the timer 28, the pulse width of the gear shifting signal $S_t$ may be set in a desired manner to generate a pulse signal $P_2$ whose pulse width corresponds to the time period necessary for gear shifting taking place in the automatic transmission.

Designated by 29 is a transistor which when conductive connects a lock-up solenoid 30 with the power supply circuit 5. Energization of the lock-up solenoid 30 causes a lock-up torque converter to operate in a lock-up state, while, deenergization thereof causes the torque converter to operate in a usual converter state. To a NAND gate 31 connected to the base of the transistor 29, said lock-up permission signal $S_L$ and a pulse signal $P_2$ are fed. During crusing operation of the vehicle which is free from a gear shifting in the automatic transmission and thus free from the occurrence of the pulse signal $P_2$, the NAND gate 31 causes the conduction of the transistor 29 or non-conduction thereof, in the following manner, in response to the presence or absence of the lock-up permission signal $S_L$. That is, when the vehicle operates within said lock-up range A or B or C when, as previously described, the L level lock-up permission signal $S_L$ is present, this signal $S_L$ causes the NAND gate 31 to issue a H level lock-up signal S, allowing the conduction of the transistor 29 to energize the lock-up solenoid 30, causing the torque converter to operate in a lock-up state. If the L level lock-up permission signal $S_L$ is absent when the vehicle operates outside of the lock-up ranges A, B and C, this causes the NAND gate 31 to issue a L level signal, allowing non-conduction of the transistor 29, causing the torque converter to operate in a converter state.

As will be apparent from the preceding description, while a shift is made in the automatic transmission, the pulse signal $P_2$ is issued, and this pulse signal causes the NAND gate 31 to issue a L level signal, thus suspending the lock-up state, even if the vehicle operates within the lock-up range A or B or C, for the time period corresponding to the pulse width of the pulse signal $P_2$ (the time period corresponding to the time period required for actual gear shifting in the automatic transmission) by rendering the transistor 29 non-conductive to cause the deenergization of the lock-up solenoid 30, thereby preventing the occurrence of a gear shift shock which is great when the gear shifting occur with the lock-up state.

Figure 3:
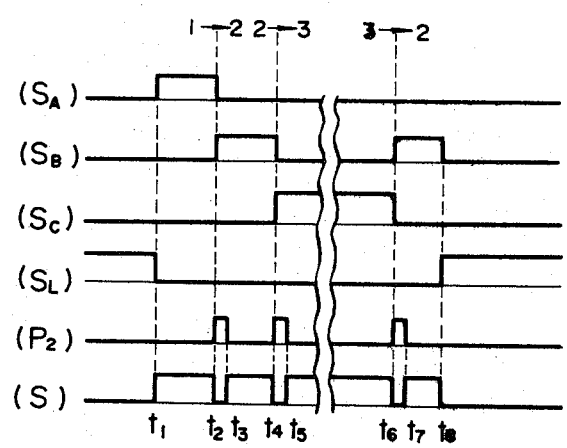
FIG. 3 is a timing diagram of various signals issued by the circuit shown in FIG. 1 or FIG. 2.

Referring to FIG. 3, there is shown a timing diagram showing a variation in level of each of a various kinds of signals $S_A$, $S_B$, $S_C$, $S_L$, $P_2$, and S which are processed in the lock-up control system. As is apparent from this Figure, a L level lock-up permission signal $S_L$ appears in response to a H level signal $S_A$ at the instance $t_1$ when the vehicle speed exceeds the lock-up vehicle speed during operation of the vehicle in the first gear. If under this condition, a pulse $P_2$ is absent as a result that the transmission is not involved in gear shifting, a H level lock-up signal S is issued to cause the torque converter to operate in the lock-up state. Subsequently, if 1-2 gear shifting takes place at the instance $t_2$ when the vehicle operates at a vehicle speed higher than the lock-up vehicle speed $V_2$ for the second gear, a signal $S_B$ rises instead of the signal $S_A$, thus causing the lock-up signal $S_L$ to keep on existing. At this instance, a pulse signal $P_2$ representing that the transmission is involved in the gear shifting is issued, causing the lock-up signal S to disappear for the time period corresponding to the pulse width thereof, viz., the time period between $t_2$ and $t_3$, but the lock-up signal S rises again after the pulse signal $P_2$ has disappeared subsequently. If 2-3 gear shifting takes place at the instance $t_4$ when the vehicle operates at a vehicle speed higher than the lock-up vehicle speed $V_3$ for the third gear, a signal $S_C$ rises instead of the signal $S_B$, thus causing the lock-up signal $S_L$ to keep on existing. At this instance, a pulse signal $P_2$ representing that the transmission is involved in the gear shifting is issued, the lock-up signal S disappears for the time period corresponding to the pulse width thereof, viz, for the time period between $t_4$ and $t_5$ and subsequently rises again. Subsequently, at the instance $t_6$ when 3-2 gear shifting takes place during operation of the vehicle at a vehicle speed higher than the lock-up vehicle speed $V_2$ for the second gear, the signal $S_B$ rises instead of the signal $S_C$, causing the L level lock-up permission signal $S_L$ to keep on existing. In this case too, a pulse signal $P_2$ representing that the transmission is involved in gear shifting is issued, causing the lock-up signal S to disappear for the time period corresponding to the pulse width thereof, viz, for the time period between $t_6$ and $t_7$, and the lock-up signal rises again subsequently. At the instance $t_8$ when the vehicle speed decreases below the lock-up vehicle speed $V_2$ for the second gear, all of the signals $S_A$, $S_B$ and $S_C$ all go to L levels, causing the L level lock-up permission signal $S_L$ to disappear, causing the lock-up signal S to disappear, either.

According to the present invention, the lock-up control system mentioned above is provided with a lock-up indicator system which will be described hereinafter. The lock-up indicator system comprises a NOT gate 32 that inverts the lock-up permission signal $S_L$, a delay circuit including a resistor 33 and a capacitor 34, a transistor 35, a lock-up indicator 36, such as an illumination diode or a lamp, mounted near the driver's seat, and a resistor 37, wherein one terminal of the indicator 36 is connected through the resistor 37 with the power supply 5 and the other terminal thereof is grounded through the collector-emitter path of the transistor 35.

The above-mentioned arrangement permits the NOT gate 32 to feed a H level signal to the base of the transistor 35 as long as the L level lock-up permission signal $S_L$ is issued when the vehicle operates within the lock-up range, causing the transistor conductive, thus energizing the indicator 36 with the power supply circuit 5, indicating to the driver that the torque converter operates in the lock-up state. Although the L level lock-up permission signal $S_L$ disappears temporarily for a time period of the order ns (nano second) which might turn off the indicator 36 when one of the signals such as $S_A$, $S_B$ and $S_C$ changes its level at $t_2$ or $t_4$ or $t_6$, the delay circuit including the resistor 33 and the capacitor 34 securely prevents the indicator 36 from being turned off.

During operation of the vehicle with the converter state outside of the lock-up ranges, the L level lock-up permission signal $S_L$ is absent, allowing the NOT gate 32 to invert L level input and feed the inverted output to the base of the transistor 35, causing the transistor non-conductive, thus deenergizing the indicator 36. Thus, the driver can know that the torque converter operates in the converter state by the turned off state of the indicator 36.

With the lock-up indicator system according to the present invention wherein the indicator 36 is arranged to by energized by the lock-up permission signal (L level in the illustrated embodiment) which represents that the vehicle operates within the lock-up range, and as long as the vehicle operates within the lock-up range such as for the time period from $t_1$ to $t_8$, the lock-up permission signal $S_L$ continues to be issued even if the lock-up is suspended due to the gear shifting (such as, the instance from $t_2$ to $t_3$, the instance from $t_4$ to $t_5$, or the instance from $t_6$ to $t_7$), thus getting around the inconvenience that the indicator 36 is turned off during such gear shifting which interferes with the driver's view and causes the driver to take it as the sign of disorder.

Figure 2:
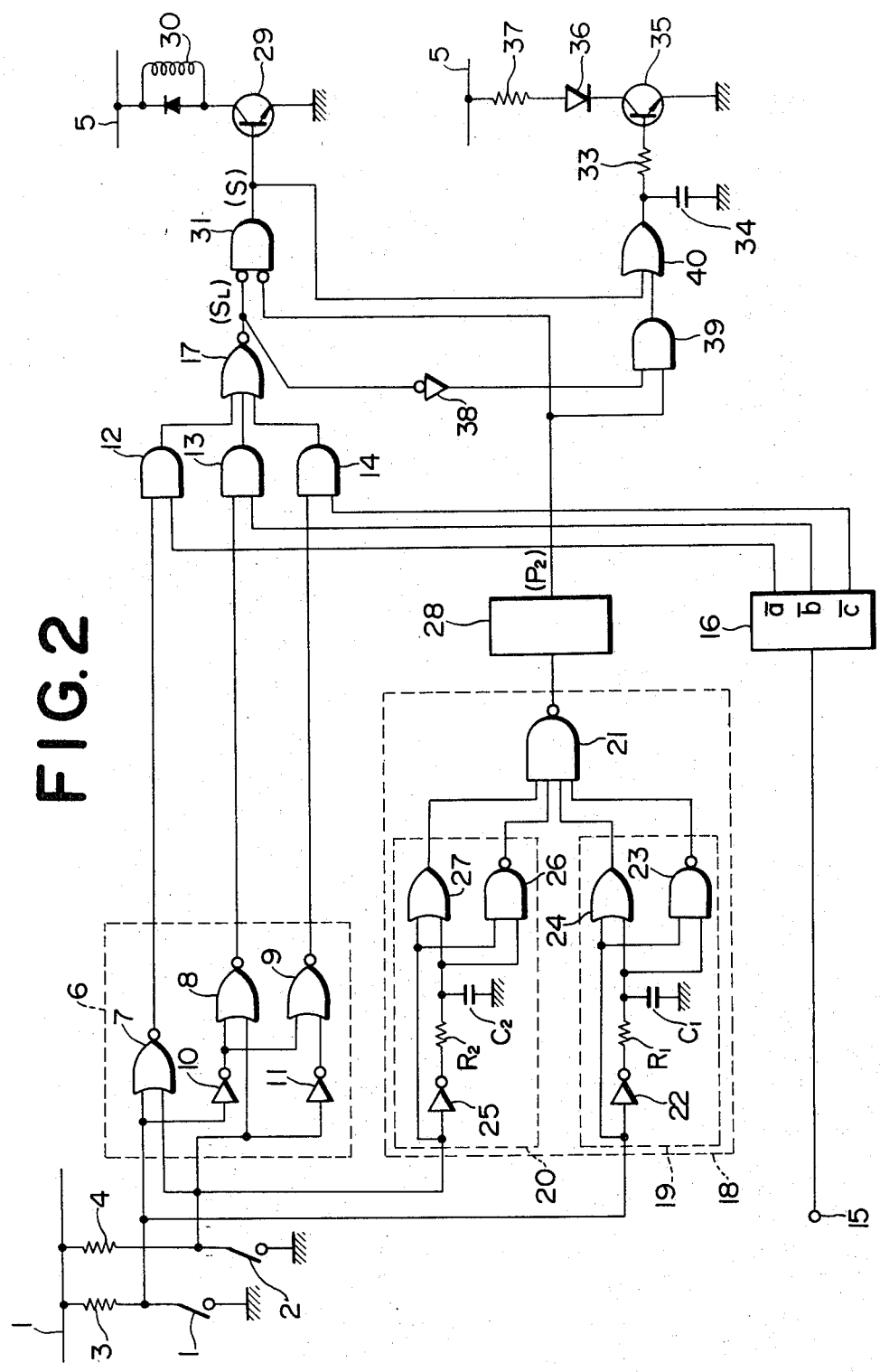
FIG. 2 is a similar diagram to FIG. 1 showing a second embodiment of the present invention.

FIG. 2 shows another embodiment of a lock-up indicator system according to the present invention wherein the like reference numerals are used to denote like parts as used in FIG. 1 for the sake of avoiding duplicate description. In this embodiment, although said lock-up permission signal is inverted by a NOT gate 38 similarly to the previous embodiment, the inverted output of the NOT gate is fed to one input of an AND gate 39 together with a pulse signal $P_2$ fed to the other input to cause the AND gate to feed its output to one input of an OR gate 40 together with a lock-up signal S fed to the other input to cause the OR gate to feed its output to the base of a transistor 35.

With the arrangement just as described, although when the lock-up is actually effected in response to a H level lock-up signal S which appears at the instance from $t_1$ to $t_2$ or at the instance from $t_3$ to $t_4$ or at the instance from $t_5$ to $t_6$ or at the instance from $t_7$ to $t_8$, this signal S causes the OR gate 40 to issue a H level signal to energize the indicator 36 by rendering the transistor 35 conductive, during the gear shifting when the H level lock-up signal S disappears temporarily, such as at the instance from $t_2$ to $t_3$ or at the instance from $t_4$ to $t_5$ or at the instance from $t_6$ to $t_7$, even when the vehicle operates within the lock-up range, the L level lock-up permission signal $S_L$ is inverted by the NOT gate 38 and the inverted output causes the AND gate 39 to feed a H level signal if the positive polarity pulse signal $P_2$ appears, thus causing the OR gate 40 to render the transistor 35 conductive in this instance too, thereby keeping on energizing the indicator 36 to let the driver know that the torque converter operates in the lock-up state.

When the torque converter operates in the converter state during the operation of the vehicle outside of the lock-up range, the L level lock-up permission signal $S_L$ and H level lock-up signal S are absent, thus causing the gates 39 and 40 to issue L level signals, preventing the transistor 35 from being rendered conductive to maintain the indicator 36 denergized, thus letting the driver know that the torque converter operates in the converter state.

What is claimed is:

1. An indicator system for a lock-up type automatic transmission for an automotive vehicle, the lock-up type automatic transmission including means for generating a lock-up permission signal, means for generating a gear shifting signal representing that a gear shift is made within the automatic transmission, and means for causing the lock-up type automatic transmission to operate in a lock-up state when the lock-up permission signal is generated unless the gear shifting signal is generated and for temporarily suspending the lock-up state to cause the lock-up type automatic transmission to operate in a converter state in response to the gear shifting signal even if the lock-up permission signal is generated, the indicator system comprising:

an indicator; and means for energizing said indicator in response to said lock-up permission signal.

2. An indicator system as claimed in claim 1, wherein said energizing means includes a NOT gate and a delay circuit connected in series.

3. An indicator system as claimed in claim 1, wherein said energizing means includes an AND gate means responsive to said gear shifting signal and said lock-up permission signal, an OR gate means connected with said AND gate and a delay circuit connected to said OR gate means.

* * * * *